(12) United States Patent
Caprarotta et al.

(10) Patent No.: US 9,403,298 B2
(45) Date of Patent: Aug. 2, 2016

(54) PROCESS FOR PACKAGING SOLID COSMETIC PRODUCTS INSIDE A CONTAINER

(75) Inventors: Grazia Anna Caprarotta, Verdello (IT); Marina Guanziroli, Chieve (IT)

(73) Assignee: COLOR COSMETICS S.R.L., Milan (IT)

( * ) Notice: Subject to any disclaimer, the term of this patent is extended or adjusted under 35 U.S.C. 154(b) by 1208 days.

(21) Appl. No.: 13/303,472

(22) Filed: Nov. 23, 2011

(65) Prior Publication Data

US 2012/0131886 A1 May 31, 2012

(30) Foreign Application Priority Data

Nov. 26, 2010 (IT) .............................. MI2010A2194

(51) Int. Cl.
*B65B 3/04* (2006.01)
*B29C 47/36* (2006.01)
*B29C 39/00* (2006.01)
*B29C 67/24* (2006.01)
*B29K 83/00* (2006.01)
*B29L 31/00* (2006.01)

(52) U.S. Cl.
CPC .............. *B29C 39/006* (2013.01); *B29C 67/246* (2013.01); *B29K 2083/005* (2013.01); *B29L 2031/712* (2013.01)

(58) Field of Classification Search
CPC ...... B29C 39/006; B29C 67/246; B29C 3/10; B29C 67/247; B29L 2031/712; B29K 2083/005
USPC .................................................. 53/473, 474
See application file for complete search history.

(56) References Cited

U.S. PATENT DOCUMENTS

| 6,058,942 | A | * | 5/2000 | Eng ................................. 132/200 |
| 6,076,533 | A | * | 6/2000 | Cohen et al. ................... 132/298 |
| 6,085,759 | A | * | 7/2000 | Joulia ............................. 132/293 |
| 6,953,543 | B2 | * | 10/2005 | Maio et al. ...................... 264/279 |
| 7,316,235 | B2 | * | 1/2008 | Maio et al. ...................... 132/293 |
| 7,987,860 | B2 | * | 8/2011 | Ancorotti ....................... 132/293 |
| 8,585,953 | B2 | * | 11/2013 | Caprarotta et al. ............ 264/319 |

(Continued)

FOREIGN PATENT DOCUMENTS

EP 1325692 A3 * 11/2002
EP 1 325 692 A2 7/2003

(Continued)

OTHER PUBLICATIONS

Search Report and Written Opinion issued Sep. 12, 2011 in corresponding Italian Application No. MI20102194.

*Primary Examiner* — Stephen F Gerrity
*Assistant Examiner* — Eyamindae Jallow
(74) *Attorney, Agent, or Firm* — Wenderoth, Lind & Ponack, L.L.P.

(57) ABSTRACT

A bi-component silicone resin (6) is introduced into a container (4). A placement of at least one solid cosmetic product (5) is placed on the silicone resin (6) introduced in the container (4). The resin (6) is polymerized with consequent anchoring of the cosmetic product (5) to the container (4). The bi-component silicone resin is a modified polyvinyldimethylsiloxane-based resin consisting of two low viscosity elastomeric silicones, polyvinylmethylvinylsiloxanes and polymethylhydrogensiloxane, suitably mixed. In particular, a RTV-GEL resin or an elastomeric RTV resin is used.

5 Claims, 2 Drawing Sheets

(56) References Cited

U.S. PATENT DOCUMENTS

| | | | |
|---|---|---|---|
| 2003/0121235 A1* | 7/2003 | Maio et al. | 53/452 |
| 2003/0183240 A1 | 10/2003 | Manougian et al. | |
| 2004/0001869 A1* | 1/2004 | Yago et al. | 424/401 |
| 2006/0006579 A1* | 1/2006 | Maio et al. | 264/279 |
| 2006/0198692 A1* | 9/2006 | Petit | 401/266 |
| 2008/0063676 A1* | 3/2008 | Ancorotti et al. | 424/401 |
| 2009/0148393 A1* | 6/2009 | Maitra | A61K 8/29 424/63 |
| 2012/0093560 A1* | 4/2012 | Arditty | 401/1 |

FOREIGN PATENT DOCUMENTS

| | | | | |
|---|---|---|---|---|
| EP | 2392225 A1 | * | 12/2011 | |
| JP | 2002047135 A | * | 2/2002 | A61K 7/00 |

* cited by examiner

PROCESS FOR PACKAGING SOLID COSMETIC PRODUCTS INSIDE A CONTAINER

BACKGROUND OF THE INVENTION

The present invention relates to a process for packaging solid cosmetic products inside a container.

Solid cosmetic products, in particular make-up products, are marketed in appropriate packages, provided with preformed components of the same shapes and size as the cosmetic products, in which they are arranged and fixed in order to ensure hold and integrity.

Solid cosmetic products, as known, may be assembled inside a container using an adhesive which keeps them anchored within the internal cavity of the container itself. This anchoring process may have several variants.

For example, the product may be anchored in advance to a completely closed bottom (free from holes), which may consist of different materials, such as for example plastic, metal, expanded materials, ceramic compounds, etc. Here, the adhesive works between the bottom itself and the inner cavity of the container and does not come into contact with the cosmetic.

Alternatively, the cosmetic product may be anchored in advance to a bottom provided with holes, consisting of different materials, such as for example plastic, metal, expanded materials, ceramic compounds, etc. Here, the adhesive works both on the perforated base and on the cosmetic product, thus anchoring them both to the inner cavity of the container.

Another possibility is that the cosmetic product is free from a base and is thus glued directly to the inner cavity of the container. Here, the adhesive works between the container and the cosmetic product.

Hot melt adhesives or vinyl glues have been used so far to anchor a solid cosmetic product to a bottom or to a container, but the products assembled with these glues did not often pass quality tests, such as crash tests, i.e. stress caused by impacts, falls, rolling, etc. Furthermore, both vinyl glues and hot melt adhesives may cause problems of bad odor in the finished product.

SUMMARY OF THE INVENTION

In view of this background art, it is the object of the present invention to provide a packaging of a cosmetic product inside a container, in which the cosmetic product, free from support is directly anchored to the container so as to improve the view of the product itself and its impact resistance.

In accordance with the present invention, such an object is achieved by using modified polyvinyldimethylsiloxanes as adhesives, such as RTV-GEL or RTV elastomers, where RTV means "Room Temperature Vulcanization". In particular, adhesive products marketed with the names "Bluestar Silicones" Silbione RT GEL 4317 and RT GEL 4320, and Wacker SilGel, Dow Corning MG 7-9850 may be used.

These are bi-component silicone resins consisting of two low viscosity elastomeric silicones, polyvinylmethylvinylsiloxanes and polymethylhydrogensiloxanes, which if suitably mixed turn into a resistant, elastic gel that overcomes the aforesaid drawbacks and fully satisfies quality tests.

By virtue of the present invention, a packaging for containing solid cosmetic products may thus be provided which does not require further components for enclosing the cosmetic product inside the packaging and which excels in quality tests, such as crash tests.

The gluing process may be carried out as described below with reference to the accompanying drawings.

DETAILED DESCRIPTION OF THE PREFERRED EMBODIMENT

Figure 1:
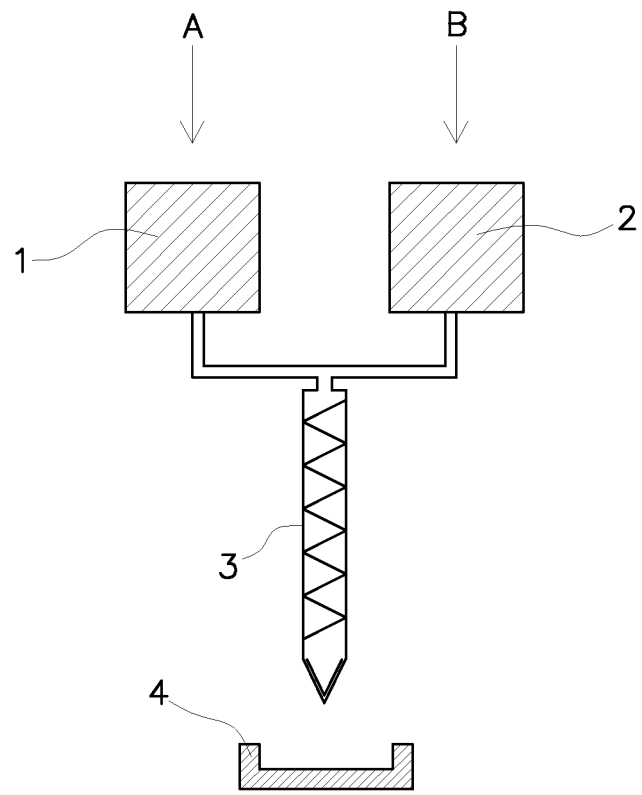
FIG. 1 is a schematic view of two components, a static mixer and a container.

FIG. 1 shows two components A and B of the chosen resin being simultaneously dosed by means of two pumps 1 and 2 and a static mixer 3, inside a container 4.

The static mixer 3 perfectly and uniformly mixes the two components thus trigging a reaction of variable duration (polymerization) between the two.

The resin is normally dosed as at ambient temperature, but the two components may be heated either before, during or after mixing in order to reduce the cross-linking time.

Figure 2:
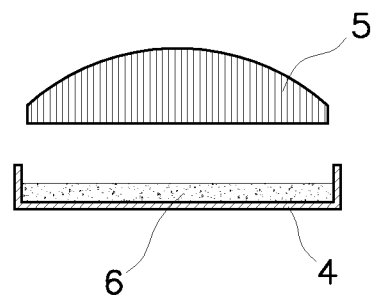
FIG. 2 is a cross-sectional view illustrating the positioning of cosmetic product.
Figure 3:
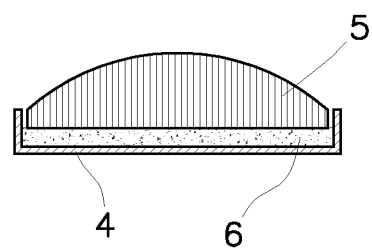
FIG. 3 is another cross-sectional view illustrating the positioning of a solid cosmetic product.

A solid cosmetic product 5 may then be positioned, either manually or by means of an automatic handler, inside container 4 where the RTV resin 6 was dosed, as shown in FIGS. 2 and 3.

Figure 4:
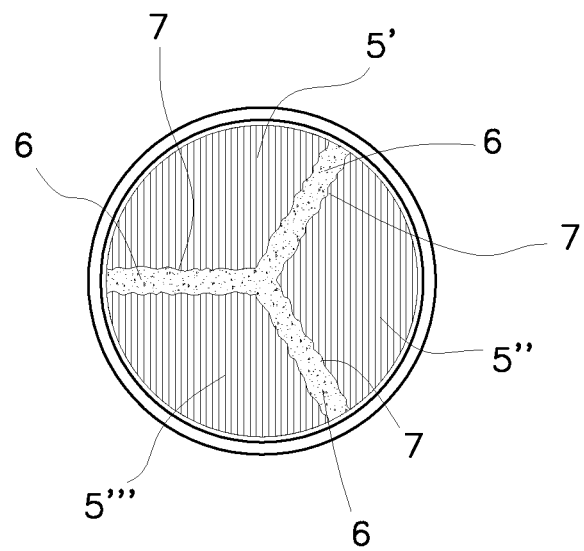
FIG. 4 is a plan view of a cosmetic container with a plurality of blocks of cosmetic product.
Figure 5:
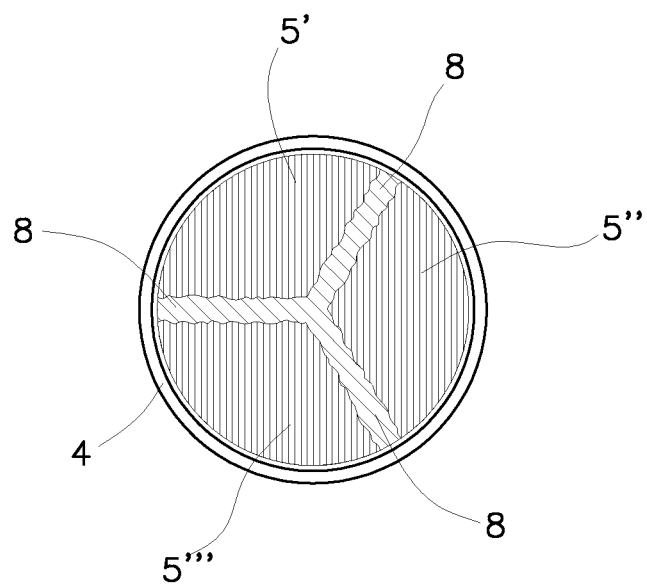
FIG. 5 is a view similar to FIG. 4 including colored separators between blocks of cosmetic product.

Alternatively, one or more cosmetic products may be arranged side by side in the same container. In such a case, after pouring resin 6, the single blocks 5', 5", 5"'—even of different composition—are arranged inside container 4 over the resin, leaving separation spaces 7 with resin only between one block and the next (FIG. 4). The resin contained in spaces 7 may also be coloured, thus obtaining the effect shown in FIG. 5, where the various blocks of cosmetic product are separated by colored separators 8.

The polymerization of the resin occurs over a varying time according to temperature and type of RTV resin, with consequent anchoring of the cosmetic product to the container.

The two elements may be anchored:

by adhesion: here, a RTV-GEL resin is preferably used which, after the cross-linking process, takes the consistency and appearance of a sticky gel, thus working as a real adhesive; however, an elastomeric RTV resin may also be used.

by mechanical anchoring: here, RTV-GEL resins may be used, but elastomeric resins are preferably used because of their consistency. With this technology, the hold between the two components to be assembled occurs through the incorporation of the cosmetic product which is entrapped inside the container by means of the RTV resin.

The invention claimed is:

1. A process for preparing a package comprising a container and at least one solid cosmetic product placed within the container comprising a plurality of blocks separated by spaces, wherein the process comprises:

introducing a bi-component silicone resin comprising a modified polyvinyldimethylsiloxane-based resin inside the container;

positioning the at least one solid cosmetic product on top of the silicone resin, the silicone resin contacting only a bottom of the at least one solid cosmetic product, wherein the positioning causes adhesion between the bottom of the at least one solid cosmetic product and the container, and the positioning leaves spaces containing only the silicone resin between the blocks of the solid cosmetic product; and polymerizing the silicone resin to anchor the blocks of the solid cosmetic product to the container.

2. The process of claim 1, wherein the silicone resin consists of two low viscosity elastomeric silicones, a polyvinylmethylvinylsiloxane and a polymethylhydrogensiloxane, suitably mixed.

3. The process of claim 2, wherein the silicone resin is a RTV-gel resin or an elastomeric RTV resin.

4. The process of claim 1, wherein the silicone resin is colored so that the spaces that contain only the silicone resin form colored separators between the blocks.

5. The process of claim 1, wherein the blocks are of different composition.

* * * * *